US010711592B2

(12) United States Patent
Jeffryes (10) Patent No.: US 10,711,592 B2
(45) Date of Patent: Jul. 14, 2020

(54) DOWNHOLE TOOL FOR MEASURING ANGULAR POSITION

(71) Applicant: SCHLUMBERGER TECHNOLOGY CORPORATION, Sugar Land, TX (US)

(72) Inventor: Benjamin Peter Jeffryes, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 24 days.

(21) Appl. No.: 15/552,709

(22) PCT Filed: Feb. 22, 2016

(86) PCT No.: PCT/US2016/018987
§ 371 (c)(1),
(2) Date: Aug. 22, 2017

(87) PCT Pub. No.: WO2016/137905
PCT Pub. Date: Sep. 1, 2016

(65) Prior Publication Data
US 2018/0045033 A1 Feb. 15, 2018

(30) Foreign Application Priority Data
Feb. 23, 2015 (GB) .................................. 1502937.4

(51) Int. Cl.
*E21B 47/024* (2006.01)
*G01V 11/00* (2006.01)

(52) U.S. Cl.
CPC ............ *E21B 47/024* (2013.01); *G01V 11/00* (2013.01)

(58) Field of Classification Search
CPC .............................. E21B 47/024; G01V 11/00
See application file for complete search history.

(56) References Cited

U.S. PATENT DOCUMENTS

| 2,656,505 A | 10/1953 | Hewitt, Jr. |
| 4,399,692 A | 8/1983 | Hulsing, II |

(Continued)

FOREIGN PATENT DOCUMENTS

| EP | 0646696 A1 | 4/1995 |
| GB | 2369188 A | 5/2002 |

(Continued)

OTHER PUBLICATIONS

Exended European Search Report for European Patent Application No. 16756134.9, dated Aug. 29, 2018, 7 pages.

(Continued)

*Primary Examiner* — Daniel R Miller (57) ABSTRACT

A downhole tool for measuring angular positions at a location within a subterranean borehole. The tool is rotatable around the longitudinal direction of the borehole. The tool includes two or more magnetometers which measure the Earth's magnetic field along respective magnetometer axes. Each magnetometer is arranged such that its measurement includes a component of the Earth's magnetic field normal to the longitudinal direction of the borehole. The magnetometers are further arranged such that these normal components are at an angle to each other around the longitudinal direction. The tool further includes a device which measures the rotational speed of the tool or the time derivative thereof. The tool includes a processor unit that calculates angular positions of the downhole tool around the longitudinal direction relative to the direction of the Earth's magnetic field from the measurements of the Earth's magnetic field and the tool rotational speed or time derivative thereof.

20 Claims, 6 Drawing Sheets

(56) References Cited

U.S. PATENT DOCUMENTS

| | | | |
|---|---|---|---|
| 4,813,274 A | 3/1989 | Dipersio et al. | |
| 4,894,923 A | 1/1990 | Cobern et al. | |
| 5,646,611 A | 7/1997 | Dailey | |
| 5,845,156 A * | 12/1998 | Onuki | G02B 27/646 396/52 |
| 6,257,062 B1 * | 7/2001 | Rich | G01P 15/0888 73/514.32 |
| 6,487,782 B1 | 12/2002 | Bond | |
| 6,529,834 B1 | 3/2003 | Estes et al. | |
| 7,341,221 B1 | 3/2008 | Wilson | |
| 7,394,385 B2 * | 7/2008 | Franco, Jr. | A61B 5/1112 340/573.1 |
| 10,392,921 B2 | 8/2019 | Jeffryes | |
| 2001/0041963 A1 * | 11/2001 | Estes | G01C 19/38 702/6 |
| 2003/0041661 A1 * | 3/2003 | Van Steenwyk | E21B 47/022 73/152.03 |
| 2004/0064286 A1 * | 4/2004 | Levi | G01C 21/12 702/141 |
| 2004/0149004 A1 | 8/2004 | Wu | |
| 2004/0222019 A1 | 11/2004 | Estes et al. | |
| 2005/0056461 A1 | 3/2005 | Estes et al. | |
| 2006/0113111 A1 * | 6/2006 | Martinez | E21B 47/024 175/45 |
| 2008/0201969 A1 | 8/2008 | Davies et al. | |
| 2008/0294344 A1 | 11/2008 | Sugiura | |
| 2009/0070056 A1 * | 3/2009 | Vocali | G01C 17/28 702/92 |
| 2009/0217539 A1 | 9/2009 | Blake | |
| 2009/0222209 A1 | 9/2009 | Morys | |
| 2010/0089572 A1 | 4/2010 | Chang | |
| 2010/0096186 A1 | 4/2010 | Ekseth | |
| 2012/0125077 A1 * | 5/2012 | Rodney | E21B 47/022 73/1.37 |
| 2014/0174733 A1 * | 6/2014 | Gadot | E21B 41/0085 166/264 |
| 2014/0336947 A1 * | 11/2014 | Walke | A61B 90/98 702/19 |
| 2015/0027779 A1 | 1/2015 | Sugiura et al. | |
| 2015/0276962 A1 * | 10/2015 | Estes | G01V 3/08 324/346 |
| 2015/0354981 A1 * | 12/2015 | Walther | G01C 19/5726 73/1.77 |
| 2016/0123134 A1 | 5/2016 | Viens | |

FOREIGN PATENT DOCUMENTS

| | | | |
|---|---|---|---|
| WO | 2005057242 A2 | 6/2005 | |
| WO | WO-2006047523 A1 * | 5/2006 | E21B 47/022 |
| WO | 2009004336 A1 | 1/2009 | |
| WO | 2011094689 A1 | 8/2011 | |
| WO | 2012135963 A1 | 10/2012 | |

OTHER PUBLICATIONS

International Preliminary Report on Patentability of International Patent Application No. PCT/US2016/018987, dated Aug. 29, 2017, 8 pages.

Combined Search and Examination Report for UK Patent Application No. GB1502937.4, dated May 29, 2015, 7 pages.

* cited by examiner

DOWNHOLE TOOL FOR MEASURING ANGULAR POSITION

BACKGROUND

Embodiments of the present disclosure relate to a downhole tool for measuring the angular position of rotatable equipment located in a subterranean borehole Measurement while drilling (MWD) and logging while drilling (LWD) tools are commonly used in oilfield drilling applications to measure physical properties of a subterranean borehole and the geological formations through which it penetrates. Such MWD/LWD techniques include, for example, natural gamma ray, spectral density, neutron density, inductive and galvanic resistivity, acoustic velocity, acoustic calliper, downhole pressure, and the like. Formations having recoverable hydrocarbons typically include certain well-known physical properties, for example, resistivity, porosity (density), and acoustic velocity values in a certain range.

In some drilling applications it is desirable to determine the azimuthal variation of particular formation and/or borehole properties (i.e. the extent to which such properties vary about the circumference of the borehole). Such information may be utilized, for example, to locate faults and dips that may occur in the various layers that make up the strata. In geo-steering applications, such "imaging" measurements are utilized to make steering decisions for subsequent drilling of the borehole. In order to make correct steering decisions, information about the strata is generally required. As described above, such information may possibly be obtained from azimuthally sensitive measurements of the formation properties. Azimuthal imaging measurements typically make use of the rotation of the drill string (and therefore the LWD sensors) in the borehole during drilling.

In the present context, by azimuthal position we mean angular position, at a measurement tool in borehole, around the longitudinal direction of the borehole relative to the direction of the Earth's magnetic field. More particularly, the azimuthal reference plane is a plane centred at the measurement tool and perpendicular to the longitudinal direction of the borehole at that point. This plane is fixed by the particular orientation of the measurement tool at the time the relevant measurements are taken. An azimuth is the angular separation in the azimuthal reference plane from a reference point to the measurement point. The azimuth is typically measured in the clockwise direction, and the reference point can be magnetic north.

Magnetometers are conventionally been used to measure azimuthal position in boreholes. However, magnetometers can suffer from poor signal-to-noise ratios, particularly when measuring angular positions affected by relatively high frequency variations in rotation speed.

Figure 1:
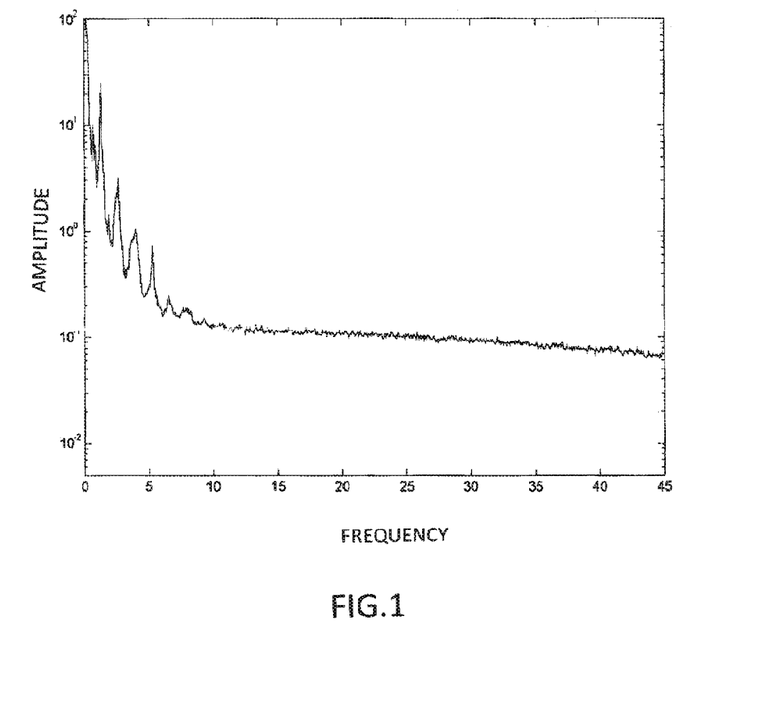
FIG. 1 shows a frequency spectrum derived from magnetometer measurements of variation in rotational speed at a subterranean location along a particular drillstring.

For example, FIG. 1 shows a frequency spectrum derived from magnetometer measurements of variation in rotational speed at a subterranean location along a particular drillstring. At frequencies of less than about 8 Hz, the measurements from the magnetometers reflect well the actual dynamics of the drillstring. However, at frequencies above about 8 Hz, the magnetometers merely measure noise, and the actual dynamics of the drillstring are lost.

Therefore, there exists a need for an improved tool for measuring angular positions, e.g. for correlation with directional formation evaluation measurements.

SUMMARY

In a first aspect, embodiments of the present disclosure provide a downhole tool for measuring angular positions at a location within a subterranean borehole where the tool is rotatable around the longitudinal direction of the borehole. The tool includes two or more magnetometers configured to measure the Earth's magnetic field along respective magnetometer axes, where each magnetometer is arranged such that its measurement includes a component of the Earth's magnetic field that is normal to the longitudinal direction of the borehole. The magnetometers are arranged such that the normal components are at an angle to each other around the longitudinal direction. The tool includes a device configured to measure the rotational speed of the tool or the time derivative thereof and a processor configured to process the angular positions of the tool around the longitudinal direction relative to the direction of the Earth's magnetic field from the measurements of the Earth's magnetic field and the tool rotational speed or time derivative thereof.

By combining these measurements, the difficulties of poor magnetometer signal-to-noise ratio can be overcome.

In a second aspect, embodiments of the present disclosure provide a drillstring including the downhole tool according to the first aspect. The drillstring can include measurement or logging equipment, e.g. MWD or LWD equipment, directional drilling equipment, or rotary steerable equipment, all of which can benefit from improved azimuthal position measurements.

In a third aspect, embodiments of the present disclosure provide a use of the tool of the first aspect for measuring angular positions at a location within a subterranean borehole. For example, a method of measuring angular positions at a location within a subterranean borehole may include providing the tool of the first aspect at the location within the borehole, rotating the tool around the longitudinal direction of the borehole, and using the tool to calculate the angular positions of the tool around the longitudinal direction relative to the direction of the Earth's magnetic field. In a process for obtaining well measurements, such a method can be preceded by: measuring one or more formation and/or borehole properties which vary with azimuthal position at a location within a subterranean borehole; and followed by: correlating the measured properties with the calculated angular positions of the tool.

Optional features of the invention will now be set out. These are applicable singly or in any combination with any aspect of the invention.

The device may comprise a gyroscope which measures the rotational speed of the tool. The processor unit can then relate the measured rotational speed to the true rotational speed by a gyroscope offset term and a gyroscope scaling term. Conveniently, the processor unit may re-calibrate the gyroscope offset term when the tool is not rotating. On the other hand, the processor unit may re-calibrate the gyroscope scaling term when the tool is rotating. For example, the re-calibration of the gyroscope scaling term can be based on a long term average of an error in the measured rotational speed being zero.

The device may comprise two or more accelerometers which measure the time derivative of the rotational speed of the tool. The processor unit can then high-pass filter the measured time derivative of the rotational speed.

Conveniently, two of the magnetometers may be arranged such that their axes are substantially in a plane normal to the longitudinal direction, and/or they may be arranged such that their normal components are substantially at 90° to each other around the longitudinal direction.

The processor unit can relate the Earth's magnetic field measured by each magnetometer to the Earth's true magnetic field by a magnetometer offset term and a magnetometer scaling term. During rotation of the tool, the processor unit can then re-calibrate the magnetometer offset and scaling terms. For example, the re-calibrations can be based on long term averages of respective error terms derived from the calculated angular positions being zero. Conveniently, the processor unit may initially calibrate the magnetometer offset and scaling terms from maximum and minimum values of their respective measurements of the Earth's magnetic field obtained during a time period when the tool is rotating.

The processor unit may combine the measurements of the Earth's magnetic field and the tool rotational speed or time derivative thereof to calculate the angular positions by employing a least squares fit. For example, the processor unit can perform gradient descent on a quadratic error term to obtain the least squares fit.

The processor unit may apply respective weightings to the measurements of the Earth's magnetic field and the tool rotational speed or time derivative thereof in the combination to calculate the angular positions. For example, the weightings applied to the measurements of the Earth's magnetic field can be based on the respective magnetometer signal-to-noise ratios. The weighting applied to the measurements of the tool rotational speed or time derivative thereof can be based on the signal-to-noise ratio and bandwidth of the device relative to the magnetometers.

At times when the device is unavailable or its measurements are unreliable, the processor unit may calculate the rotational speed of the tool for use in the calculation of the angular positions of the tool from the measurements of the Earth's magnetic field.

The tool may further include a telemetry unit for transmitting the calculated angular positions and/or a storage unit for storing the calculated angular positions.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

As disclosed herein, the term "storage unit" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "storage unit" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 2:
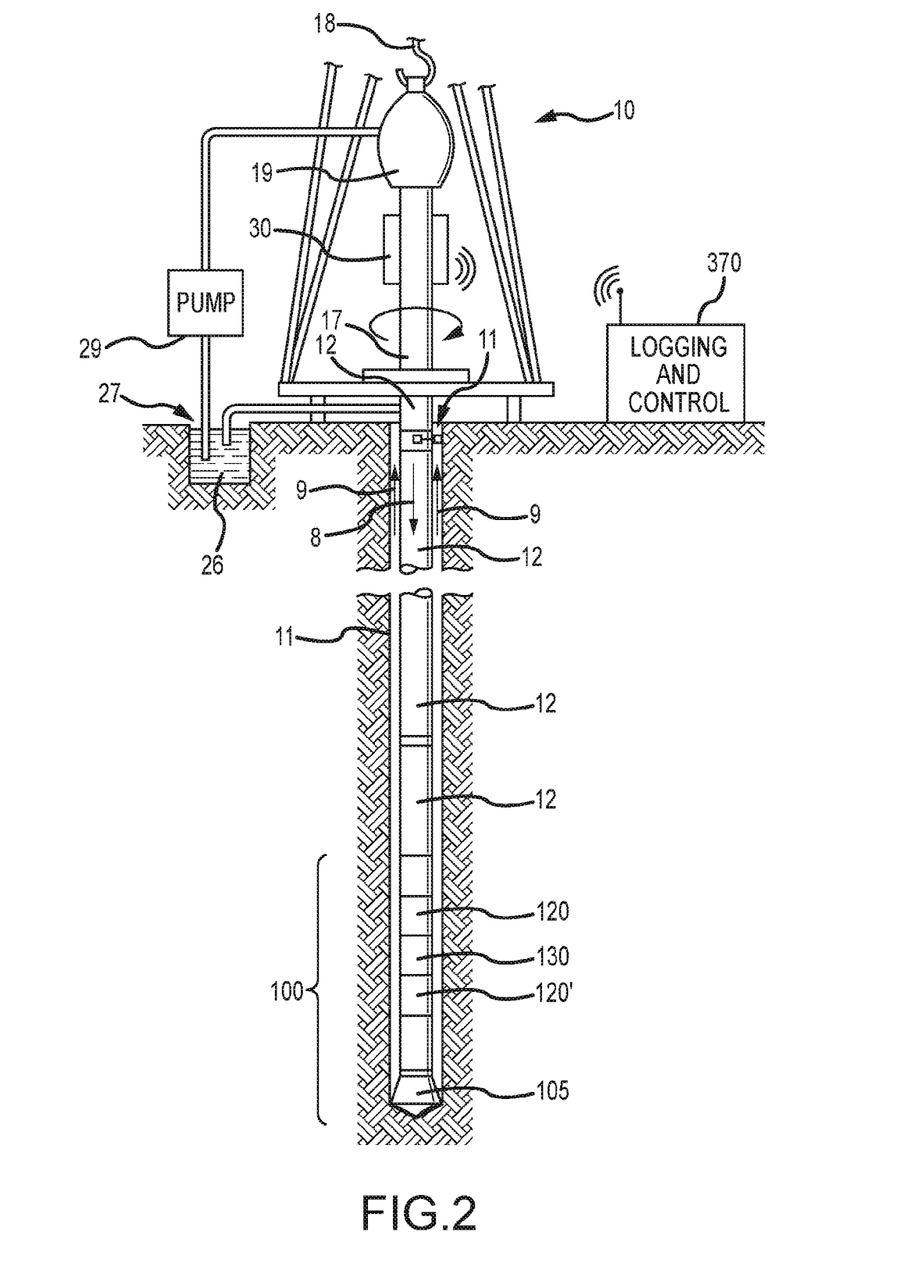
FIG. 2 illustrates a drilling system for operation at a wellsite to drill a borehole through an earth formation.

FIG. 2 illustrates a drilling system for operation at a wellsite to drill a borehole through an earth formation. The wellsite can be located onshore or offshore. In this system, a borehole 11 is formed in subsurface formations by rotary drilling in a manner that is well known. Systems can also use be used in directional drilling systems, pilot hole drilling systems, casing drilling systems and/or the like.

A drillstring 12 is suspended within the borehole 11 and has a bottomhole assembly 100, which includes a drill bit 105 at its lower end. The surface system includes a platform and derrick assembly 10 positioned over the borehole 11, the assembly 10 including a top drive 30, kelly 17, hook 18 and rotary swivel 19. The drillstring 12 is rotated by the top drive 30, energized by means not shown, which engages the kelly 17 at the upper end of the drillstring. The drillstring 12 is suspended from the hook 18, attached to a traveling block (also not shown), through the kelly 17 and the rotary swivel 19 which permits rotation of the drillstring relative to the hook. As is well known, a rotary table system could alternatively be used to rotate the drillstring 12 in the borehole and, thus rotate the drill bit 105 against a face of the earth formation at the bottom of the borehole.

The surface system can further include drilling fluid or mud 26 stored in a pit 27 formed at the well site. A pump 29 delivers the drilling fluid 26 to the interior of the drillstring 12 via a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this well-known manner, the drilling fluid lubricates the drill bit 105 and carries formation cuttings up to the surface as it is returned to the pit 27 for recirculation.

A control unit 370 may be used to control the top drive 30 or other drive system. The top drive 30 may rotate the drillstring 12 at a rotation speed to produce desired drilling parameters. By way of example, the speed of rotation of the drillstring may be: determined so as to optimize a rate of penetration through the earth formation, set to reduce drill bit wear, adjusted according to properties of the earth formation, or the like.

The bottomhole assembly 100 may include a logging-while-drilling (LWD) module 120, a measuring-while-drilling (MWD) module 130, a rotary-steerable system and motor, and drill bit 105.

The LWD module 120 may be housed in a special type of drill collar, as is known in the art, and can contain one or a plurality of known types of logging tools. It will also be understood that more than one LWD and/or MWD module can be employed, e.g. as represented at 120'. The LWD module may include capabilities for measuring, processing, and storing information, as well as for communicating with the surface equipment. The LWD module may include a fluid sampling device.

The MWD module 130 may also be housed in a special type of drill collar, as is known in the art, and can contain one or more devices for measuring characteristics of the drillstring and drill bit. The MWD tool may further includes an apparatus (not shown) for generating electrical power to the downhole system. This may typically include a mud turbine generator powered by the flow of the drilling fluid, it being understood that other power and/or battery systems may be employed. The MWD module may include one or more of the following types of measuring devices: a weight-on-bit measuring device, a torque measuring device, a vibration measuring device, a shock measuring device, a stick slip measuring device, a direction measuring device, a rotation speed measuring device, and an inclination measuring device.

The bottomhole assembly 100 includes one or more tools according to embodiments of the present disclosure for measuring angular positions. In particular, the tool, when rotatably coupled with the LWD module 120 and/or the MWD module 130, allows the azimuthal position of the module(s) to be correlated with their directional measurements. Additionally or alternatively, the tool can be rotatably coupled with the rotary-steerable system to make correct steering decisions.

Figure 3:
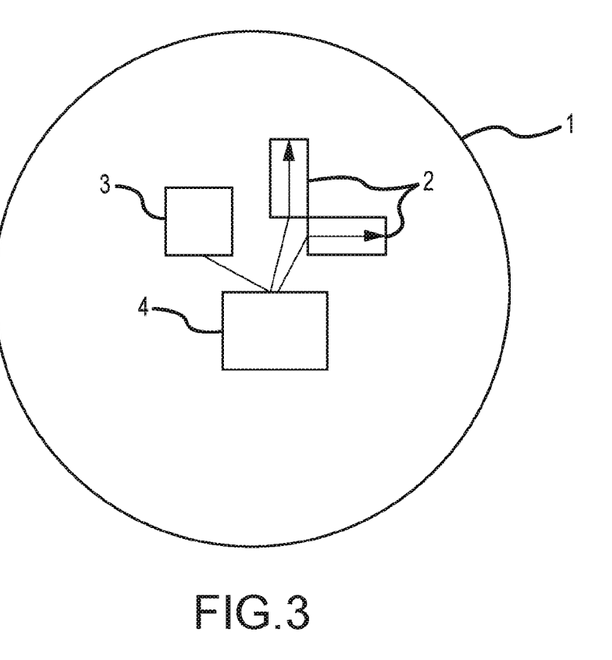
FIG. 3 shows a cross-section through a first embodiment of a tool for measuring angular positions.

FIG. 3 shows a cross-section (on a plane perpendicular to the longitudinal direction of the borehole) through a first embodiment of the tool, which has a housing 1 enclosing two single-axis magnetometers 2 and a gyroscope 3. Measurement data from the magnetometers and the gyroscope are sent to a processor unit 4, where the calculations described below are made. The tool can also have a telemetry unit and/or a data storage unit for respectively transmitting to the surface/storing for later retrieval the processed results (and optionally the raw measurement data).

The magnetometers 2 are arranged such that their axes (indicated by respective arrows) are in a plane normal to the longitudinal direction of the borehole, this direction also being the axis about which the tool rotates. The magnetometers are also arranged such that their axes are at 90° to each other around the longitudinal direction. As long as each magnetometer measures a component of the Earth's magnetic field normal to the longitudinal direction of the borehole, and these components are at an angle to each other around the longitudinal direction, other arrangements of the magnetometers are possible, but the in-plane/90° arrangement is convenient and provides a relatively good signal-to-noise ratio. Further, the use of more than two magnetometers may have advantages in improving signal-to-noise and improved redundancy.

Figure 4:
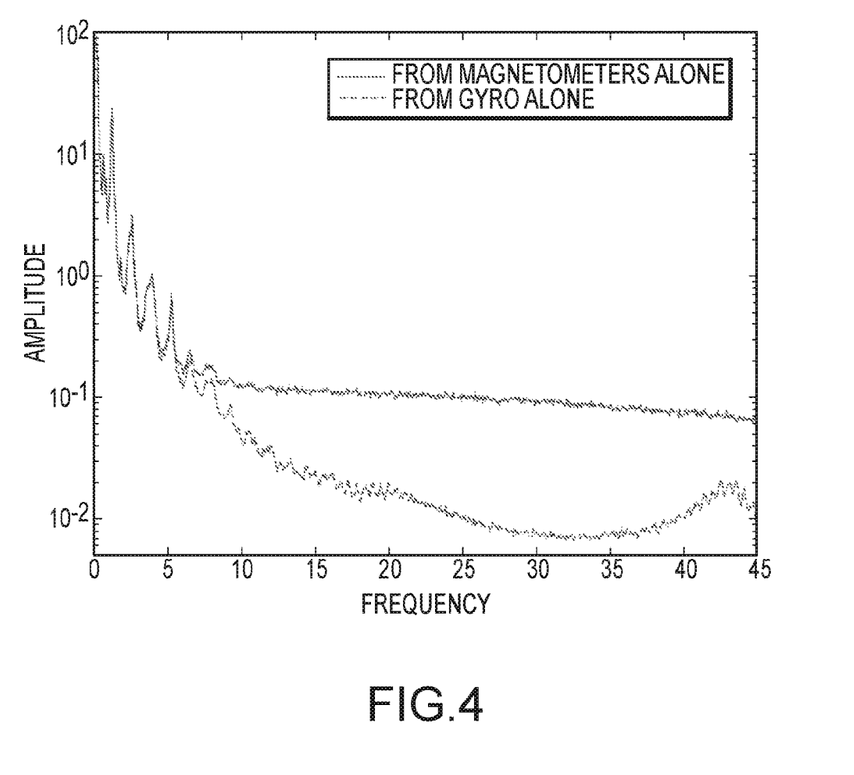
FIG. 4 shows the magnetometer frequency spectrum of FIG. 1 and a frequency spectrum derived from gyroscope measurements using the same drillstring data.

The gyroscope 3 produces an output which is nominally proportional to the rotational speed of the tool. FIG. 4 shows the magnetometer frequency spectrum of FIG. 1 and a frequency spectrum derived from gyroscope measurements of variation in rotational speed at the same subterranean location along the drillstring. Like the magnetometer measurements, the gyroscope measurements reflect well the actual dynamics of the drillstring at low frequencies. Unlike the magnetometer measurements, they continue to reflect the dynamics of the drillstring at higher frequencies. A problem with the gyroscope measurements, however, is that they are susceptible to drift. Thus embodiments of the present disclosure combine the two types of measurement to calculate the angular position of the tool. Effectively, the magnetometer and gyroscope measurements can be phase-locked so that the angular position measurement can benefit from the stability of the magnetometers and the good signal-to-noise ratio of the gyroscope.

The following analysis assumes that there are two magnetometers as described above. The extension to more than two magnetometers is straightforward and is described subsequently.

The magnetometer output m is proportional to the magnetic component M in the direction of the magnetometer axis, plus an offset term. Thus for the two magnetometer outputs $m_x$ and $m_y$, we have:

$$m_x = m_{x0} + A_x M_x$$

$$m_y = m_{y0} + A_y M_y \quad (1)$$

where $m_{x0}$, $m_{y0}$, $A_x$ and $A_y$ vary slowly with time, and in the absence of noise:

$$M_x = \cos(\theta)$$

$$M_y = \sin(\theta + \tau) \quad (2)$$

where θ is the angle between the axis of magnetometer $m_x$ and the direction of the Earth's magnetic field, and the angle between the two magnetometers is π/2+τ, τ being the departure from exactly 90° of the angle between the magnetometer axes. Whereas the amplitudes $A_x$ and $A_y$ depend on the direction of the plane of the magnetometers with respect to the earth's magnetic field, and so vary with borehole trajectory, in theory the offsets $m_{x0}$ and $m_{y0}$ are constant for a perfect magnetometer. In reality, however, all of $A_x$, $A_y$, $m_{x0}$ and $m_{y0}$ are susceptible to drift. Additionally, any misalignment of the magnetometers which results in their not being precisely aligned with the plane of rotation of the tool results in a component of the Earth's magnetic field along the direction of rotation being present as a slowly varying component.

The gyroscope signal ω is related to the true rotation speed Ω by a similar linear relationship:

$$\omega = \omega_0 + \frac{1}{\rho}\Omega \quad (3)$$

where $\omega_0$ and ρ also slowly vary with time. Some gyroscopes show a small but consistent error proportional to the cube of the rotation speed. This may be corrected for by first applying a correction term to ω which is proportional to ω cubed.

Thus, to derive good estimates of the angle θ and the rotation speed Ω, it is necessary to know the six slowly varying calibration quantities $A_x$, $A_y$, $m_{x0}$, $m_{y0}$, $\omega_0$ and ρ.

An algorithm is described below for calculating θ and Ω, and also for continuously calibrating the magnetometers and gyroscope. However, in order to start the algorithm, initial values for $A_x$, $A_y$, $m_{x0}$, $m_{y0}$, $\omega_0$ and ρ are needed.

If the gyroscope has previously been calibrated, then the initial values of $$\omega_0 = 0$$

$$\rho = 1 \quad (4)$$

may be used. Another option, however, is to base the initial calibration on a previous period of use of the gyroscope. From such a period of use, for example, average values of $\omega_0$ and ρ can be determined suitable for initiating a next period of use.

An option for obtaining initial calibration values for the magnetometers is to sample the magnetometers over a period of time when the tool is known to be rotating. The extremal values of $m_x$ and $m_y$ can be recorded from this period, and the following equations used to derive $A_x$, $A_y$, $m_{x0}$ and $m_{y0}$.

$$m_{x0} = \frac{1}{2}(\max(m_x) + \min(m_x)) \quad (5)$$

$$m_{y0} = \frac{1}{2}(\max(m_y) + \min(m_y))$$

$$A_x = \frac{1}{2}(\max(m_x) - \min(m_x))$$

$$A_y = \frac{1}{2}(\max(m_y) - \min(m_y))$$

Given a set of calibration quantities, the three variables $M_x$, $M_y$ and Ω can be calculated. From these the single variable θ must be derived, where (ignoring noise terms), $M_x$, $M_y$ and Ω are linked to θ by the equations:

$$M_x = \cos(\theta) \quad (6)$$

$$M_y = \sin(\theta + \tau)$$

$$\Omega = \frac{d\theta}{dt}$$

In order to find the best θ, a quadratic error term can be derived. Assuming that at time-step j, there is already an angle estimate for the previous time-step j−1, the error function can be:

$$E = K_X(M_X - \cos(\theta_j))^2 + K_Y(M_Y - \sin(\theta_j + \tau))^2 + C(\theta_j - (\theta_{j-1} + \Omega dt))^2 \quad (7)$$

where $K_x$, $K_y$ and C are weighting quantities, and dt is the time between samples. Rather than find the value of $\theta_j$ which minimizes E, it can be quicker to start from the initial updated value using the gyro rotation speed measurement:

$$\theta_0 = \theta_{j-1} + \Omega dt \quad (8)$$

and then use gradient descent to improve this, obtaining:

$$\theta_j = \\ \theta_0 - \frac{1}{C}[K_X \sin(\theta_0)(M_X - \cos(\theta_0)) - K_Y \cos(\theta_0 + \tau)(M_Y - \sin(\theta_0 + \tau))] \quad (9)$$

The choice of appropriate values for the weighting quantities $K_x$, $K_y$ and C used in the error minimization is discussed below. To modify of these equations for more than two magnetometers it is simply a matter of including extra terms in equations (7) and (9) corresponding to the extra magnetometers.

Having calculated the sequence $\theta_j$, this can be used to adjust $A_x$, $A_y$, $m_{x0}$, and $m_{y0}$.

From $m_{x0}$, $A_x$ and θ a theoretical magnetometer reading μx can be calculated:

$$\mu_X = m_{0x} + A_X \cos(\theta) \quad (10)$$

Let $$d_X = m_x - \mu_X \quad (11)$$

If $m_x$ is correct then $d_x$ should be zero mean. By taking a long-time average of $d_x$, and adjusting $m_{x0}$ with this, $d_x$ can be adjusted. Thus for some small value δ, the average value of $d_x$ can be estimated using exponential averaging:

$$\langle d_x \rangle(j) = (1-\delta)\langle d_x \rangle(j-1) + \delta d_X \quad (12)$$

and this then used to incrementally adjust the offset $m_{0x}$:

$$m_{0x}(j) = m_{0x}(j-1) + \delta \langle d_x \rangle(j) \quad (13)$$

and similarly for the other magnetometer(s). The adjustment coefficient δ in equation (13) is the same as in equation (12), although this is not essential.

A related approach can be used to adapt the amplitude. The error term (similar to $d_x$ above) used to adjust the amplitude should be of one sign when $A_x$ is too small, and of opposite sign when $A_x$ is too large. Such an error term is $f_x$ defined in equation (14)

$$f_x = |M_x| - |\cos(\theta)| \quad (14)$$

This will be zero mean if $A_x$ is correct.

However, if an average value of $f_x$ is calculated and, used to adjust $A_x$ in a similar manner to the use of $d_x$ to adjust $m_{0x}$, then instabilities can result. By only calculating $f_x$ when the absolute value of $\cos(\theta)$ is close to one, these instabilities can be avoided. Thus:

If $|\cos(\theta)| > \frac{3}{4}$ $f_x = (|M_x| - |\cos(\theta)|)$ $\langle f_x \rangle(j) = (1-\delta)\langle f_x \rangle(j-1) + \delta f_x$ If $|\cos(\theta)| < \frac{3}{4}$ $f_x = 0$ $\langle f_x \rangle(j) = \langle f_x \rangle(j-1)$ and the amplitude is modified according to:

$$A_X(j) = A_X(j-1) + \delta \langle f_x \rangle \quad (15)$$

Similarly, the calibration of the gyroscope can be corrected using the deviation term in equation (9). Let $$\varepsilon = \frac{1}{C}[K_X \sin(\theta_0)(M_X - \cos(\theta_0)) - K_Y \cos(\theta_0 + \tau)(M_Y - \sin(\theta_0 + \tau))] \quad (16)$$

If the gyroscope is calibrated correctly, then $\varepsilon$ will be zero mean, and hence the long term average of $\varepsilon$ can be used to adjust the gyro calibration. However, there are two gyro calibration constants (offset $\omega_0$ and scaling $\rho$), and this is just one adjustment.

In normal drilling operations, there are lengthy periods during which no rotation takes place (for example, connections, when additional pipe is added to the drillstring). During these periods, the offset term $\omega_0$ can be adjusted to zero the gyroscope output, and at other times the deviation term $\varepsilon$ can be used to adjust the scaling $\rho$. Thus, while rotating the tool the offset $\omega_0$ is kept constant and the scaling $\rho$ adjusted, and while the tool is stationary the scaling is kept constant the offset adjusted.

A simple approach for identifying periods of no-rotation is to use the rotation speed derived from the calculated angle $\theta_j$, (see equations (20) and (21) below for a method of calculation). Only when the absolute value of this, or a low-pass filtered version of it, is below a threshold is the offset term $\omega_0$ adjusted. When the absolute value or low-pass filtered version is above this threshold then the deviation term is used to adjust the scaling $\rho$.

Other methods for continuously estimating offsets and amplitudes may also be employed, for instance by exploiting the fact that if $m_x$ is proportional to the cosine of an angle, and $m_y$ is proportional to the sine of the same angle with the same proportionality then the sum of the squares of $m_x$ and $m_y$ will be constant over time.

If $m_x$ and $m_y$ are given by equation (1) then $$m_x^2 + m_y^2 \approx \frac{1}{2}(A_x^2 + A_y^2) + 2m_{x0}m_x + \quad (16a)$$

$$2m_{y0}m_y + \frac{1}{2}(A_x^2 - A_y^2)\cos(2\theta) + \tau A_y^2 \sin(2\theta)$$

By calculating the correlation between the sum of the squares of $m_x$ and $m_y$, and $m_x$ and $m_y$ individually, using equation (16a), the offset terms $m_{x0}$ and $m_{y0}$ may be estimated, either using continuous methods or calculating the correlation over past data periods. The difference between the squared amplitude $A_x$ and $A_y$ may also be calculated by combining this with a correlation against an estimate of $\cos(2\theta)$.

Returning then to the weightings used in the error minimization at equation (9). $K_x$, $K_y$ and C are related to the signal-to-noise level. If the signal-to-noise level on $m_x$ is high, then $K_x$ should be high, and similarly for $K_y$ in relation to signal-to-noise level on $m_y$.

In addition, attention must be paid to the relative bandwidth of the different measurements. Since $K_x$ and $K_y$ only appear divided by C, there are in fact only two weightings to be chosen. A convenient choice is thus to set $$K_x + K_y = 1 \quad (17)$$

Normally, the gyroscope bandwidth is significantly higher than the magnetometer bandwidth. If the sampling frequency is higher than the magnetometer bandwidth, then the high frequency component of the magnetometer signals will just be noise, and so the weighting C must be sufficiently large that the high frequency noise has a negligible effect on the final angle estimate.

The relative size of $K_x$ and $K_y$ can be determined by the relative signal-to-noise ratio of the two magnetometers. One approach to estimating the relative signal-to-noise is to consider the mean square of the error terms $V_x$ and $V_y$:

$$V_X(j) = (1-g)V_X(j-1) + g(M_X - \cos(\theta_t))^2$$

$$V_Y(j) = (1-g)V_Y(j-1) + g(M_Y - \cos(\theta_t + \tau))^2 \quad (18)$$

where g is a small forgetting factor.

The greater the signal-to-noise of a given magnetometer, the smaller the corresponding error term. However, if the error for $m_y$ is less than $m_x$ and is then used to increase $K_y$, a subsequent value of $\delta$ will fit $m_y$ better than $m_x$ (since more weight has been given to $m_y$), resulting in a short while to $m_x$ being ignored. In order to avoid this, a test estimate of $\theta$ can be continuously calculated, using $K_x = K_y = 0.5$. The mean square error term resulting from this estimate can then be used to generate $K_x$ and $K_y$.

Turning to the weighting C, this depends both on the relative signal-to-noise of the gyroscope and the magnetometers, and the bandwidth. A relationship such as:

$$C = C_0 + C_1(V_X + V_Y) \quad (19)$$

can be used, where $C_0$ and $C_1$ are constants.

The gyroscope may go out of range or malfunction for periods of time. To reduce problems that this can cause data from the magnetometers can be used as a pseudo-gyroscope. More particularly, when the two magnetometers are at 90°, the angular rotation speed $d\theta/dt$ is given by:

$$\frac{d\theta}{dt} = M_x \frac{dM_y}{dt} - M_y \frac{dM_x}{dt} \quad (20)$$

or more strictly, if the y magnetometer is shifted by an angle τ, (as in equation (6)), the relation is:

$$\frac{(1-\sin^2\tau)}{\cos\tau}\frac{d\theta}{dt} = M_x\left(\frac{dM_y}{dt} - \frac{dM_x}{dt}\sin\tau\right) - (M_y - M_x\sin\tau)\frac{dM_x}{dt} \quad (21)$$

This estimate of the rotation speed is relatively noisy, so a short average can be taken and this value then be substituted for Ω in equation (8). In addition, a different value of C can be used. In particular, since the magnetometer-derived rotation speed is noisier than the gyroscope-derived speed, the value of C can be reduced. Further, if an average rotation speed is taken, this delays the rotation speed measurement, and thus the angle update can also be delayed so that the magnetometer readings are synchronized with the rotation speed estimate.

During periods in which the gyroscope is unavailable, the gyroscope weighting is not updated. To ensure that any errors that occur during this period do not cause problems subsequently, the long-term average of ε can be reset to zero.

A malfunctioning gyroscope can be detected by monitoring the difference between the gyroscope measurement, and the angular-rotation measured by the magnetometers, filtered to the same bandwidth. The gyroscope can be susceptible to shock, and during and for a short time after such events it can provide bad data. By swopping the gyroscope reading for the magnetometer-derived rotation speed during a period surrounding the time when the two readings differ by more than a threshold (which can depend on the signal-to-noise ratio of the magnetometers) these errors may be largely eliminated. However, such an approach also requires a delay in the measurements.

Figure 5:
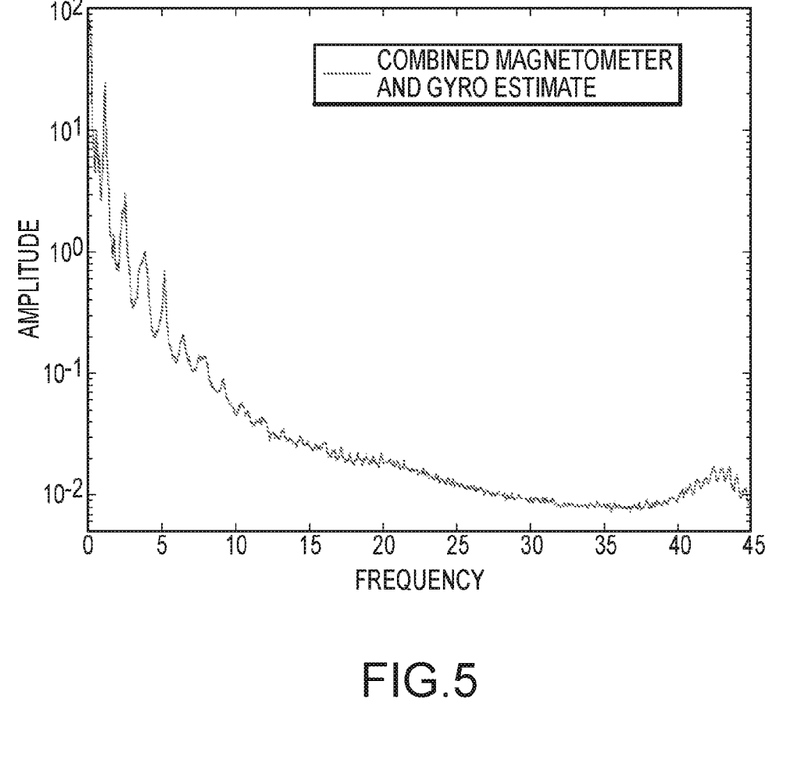
FIG. 5 shows a frequency spectrum for the same drillstring data as FIGS. 1 and 4 but analysed according to some embodiments of the present disclosure by combining magnetometer and gyroscope measurements.

FIG. 5 shows a frequency spectrum for the same drill-string data as FIGS. 1 and 4 but analysed according to embodiments of the present disclosure by combining the magnetometer and gyroscope measurements. The spectrum has a similar frequency content to the gyroscope spectrum of FIG. 4, but it is now locked to the magnetometer phase.

Figure 6:
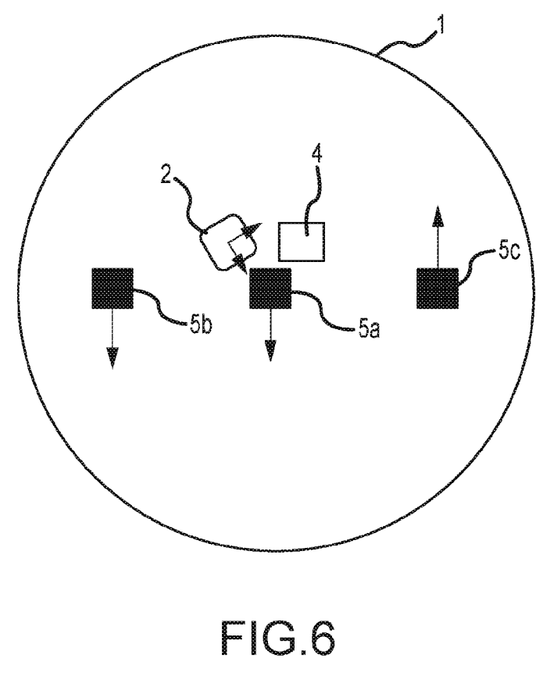
FIG. 6 shows a cross-section through a second embodiment of the tool for measuring angular positions.

In the first embodiment of the present disclosure described above, the gyroscope 3 produces an output which is nominally proportional to the rotational speed of the tool. However, another option is to combine measurements of the time derivative of rotational speed with the magnetometer measurements. Accordingly, FIG. 6 shows a cross-section (on a plane perpendicular to the longitudinal direction of the borehole) through a second embodiment of the tool, which has a housing 1 enclosing two single-axis magnetometers 2 and number of accelerometers 5a, b, c. Measurement data from the magnetometers and the accelerometers are sent to a processor unit 4, where the calculations described below are made. The tool can also have a telemetry unit and/or a data storage unit for respectively transmitting to the surface/storing for later retrieval the processed results (and optionally the raw measurement data).

Rotational acceleration may be determined by taking a linear combination of the in-plane accelerometer measurements. For example, the combination may be the difference between the readings from a first accelerometer 5a mounted in the centre of rotation, and a second accelerometer 5b pointing in the same direction, mounted on a radius normal to the accelerometer direction, divided by the distance of the second accelerometer from the centre. Another option for the combination is to take the sum of the readings of two accelerometers 5a, 5c, mounted on a diameter, and pointing normal to the diameter in opposite directions, divided by the distance between the two accelerometers. Other combinations are also possible.

The analysis is similar to that based on a gyroscope measurement of rotational speed. The magnetometers 4 and accelerometers 5a-c provide three measurements:

$$M_x = \cos(\theta) \quad (22)$$

$$M_y = \sin(\theta + \tau)$$

$$a = \frac{d^2\theta}{dt^2}$$

where a is rotational acceleration. Initial updates for the angle and rotation speed are obtained using:

$$\omega_0 = \omega_{j-1} + a_j dt$$

$$\theta_0 = \theta_{j-1} + \omega_0 dt \quad (23)$$

To obtain the rotational acceleration, the measured acceleration is preferably high-pass filtered to remove any offset in the measurement. A simple one-pole filter is convenient, to avoid delay. Accordingly, if $a_1$ is the unfiltered acceleration, then:

$$a_L = (1-\delta)a_L + \delta\alpha j$$

$$a_1 = \alpha_j - a_L \quad (24)$$

A high-pass frequency of around 0.025 Hz may be used, such that:

$$\delta = \frac{dt}{40} \quad (25)$$

The rotation speed and angle derived from the accelerometers are then sequentially adjusted using the magnetometer data: This is very similar to the approach originally used to update the angle $\theta_j$. First the angular velocity and angle derived from the initial angle velocity updates are corrected using an error term η proportional to that used in equation (9):

$$\eta = \frac{1}{Cdt}[K_X \sin(\theta_0)(M_X - \cos(\theta_0)) - K_Y \cos(\theta_0 + \tau)(M_Y - \sin(\theta_0 + \tau))]$$

$$\omega_j = \omega_0 - \eta$$

$$\theta_1 = \theta_0 - \eta dt$$

Then the final angle estimate is obtained applying the correction again, using the improved angle estimate:

$$\theta_j = \theta_1 - \quad (26)$$
$$\frac{1}{C}[K_X \sin(\theta_1)(M_X - \cos(\theta_1)) - K_Y \cos(\theta_1 + \tau)(M_Y - \sin(\theta_1 + \tau))]$$

This algorithm calculates an angular position and an angular velocity, but the angular velocity $\omega_j$ is not the time derivative of the angular position $\theta_j$. If it is desired that the angular velocity is equal to the time derivative of the angular position, then the angular position may simply be differenced. For example:

$$\Omega_j = \frac{\theta_j - \theta_{j-1}}{dt} \tag{27}$$

The raw magnetometer measurements can be calibrated using the same approaches as described above in respect of the first embodiment. Similarly, the weighting constants $K_x$ and $K_y$ can be determined in a similar way as described above.

The calculated angle and angular speed can have significant errors if the accelerometers are noisy. In particular, accelerometers can suffer from significant non-random noise over short periods, e.g. due to saturation or shocks. However, similarly to the approach described above for dealing with a malfunctioning gyroscope, a rotation speed can be calculated from the magnetometers alone and compared with the rotation speed calculated from the magnetometers. If the two diverge significantly, then the magnetometer-derived rotation speed may be used for $\omega_j$ in equation (26), until the accelerometers have recovered. This can be achieved by comparing the low-frequency component of the angular acceleration measured by accelerometers with the component of the time-derivative of the magnetometer-derived rotation speed over the same bandwidth, and using the magnetometer-derived rotation speed when the two readings differ by more than a threshold.

The invention claimed is:

1. A downhole tool for measuring angular positions at a location within a subterranean borehole, the downhole tool being configured to be rotatable around a longitudinal direction of the borehole, the downhole tool comprising:

two or more magnetometers configured to obtain measurements of the Earth's magnetic field along respective magnetometer axes, wherein each magnetometer is arranged such that the measurements of the Earth's magnetic field include a component of the Earth's magnetic field normal to the longitudinal direction of the borehole, and wherein the magnetometers are arranged such that the normal components are at an angle to each other around the longitudinal direction;

a device configured to measure a rotational speed of the tool or a time derivative thereof; and a processor unit configured to combine the measurements of the Earth's magnetic field and the tool rotational speed or time derivative thereof to calculate angular positions of the downhole tool around the longitudinal direction relative to the direction of the Earth's magnetic field by finding the angular positions that minimize weighted errors of the measurements of the Earth's magnetic field and the rotational speed of the tool or the time derivative thereof.

2. The downhole tool according to claim 1, wherein the device comprises a gyroscope which measures the rotational speed of the tool.

3. The downhole tool according to claim 2, wherein the processor unit relates the measured rotational speed to a true rotational speed by a gyroscope offset term and a gyroscope scaling term.

4. The downhole tool according to claim 3, wherein the processor unit re-calibrates the gyroscope offset term when the tool is not rotating.

5. The downhole tool according to claim 3, wherein the processor unit re-calibrates the gyroscope scaling term when the tool is rotating.

6. The downhole tool according to claim 1, wherein the device comprises two or more accelerometers which measure the time derivative of the rotational speed of the tool.

7. The downhole tool according to claim 6, wherein the processor unit high-pass filters the measured time derivative of the rotational speed.

8. The downhole tool according to claim 1, wherein two of the magnetometers are arranged such that their axes are substantially in a plane normal to the longitudinal direction.

9. The downhole tool according to claim 1, wherein two of the magnetometers are arranged such that their normal components are substantially at 90° to each other around the longitudinal direction.

10. The downhole tool according to claim 1, wherein the processor unit relates the Earth's magnetic field measured by each magnetometer to the Earth's true magnetic field by a magnetometer offset term and a magnetometer scaling term.

11. The downhole tool according to claim 10, wherein, during rotation of the tool, the processor unit re-calibrates the magnetometer offset and scaling terms.

12. The downhole tool according to claim 10, wherein the processor unit initially calibrates the magnetometer offset and scaling terms from maximum and minimum values of their respective measurements of the Earth's magnetic field obtained during a time period when the tool is rotating.

13. The downhole tool according to claim 1, wherein the processor unit combines the measurements of the Earth's magnetic field and the tool rotational speed or time derivative thereof to calculate the angular positions by employing a least squares fit.

14. The downhole tool according to claim 13, wherein the processor unit performs gradient descent on a quadratic error term to obtain the least squares fit.

15. The downhole tool according to claim 1, wherein the processor unit applies respective weightings to the measurements of the Earth's magnetic field and the tool rotational speed or time derivative thereof in the combination to calculate the angular positions.

16. The downhole tool according to claim 15, wherein the weightings applied to the measurements of the Earth's magnetic field are based on respective magnetometer signal-to-noise ratios.

17. The downhole tool according to claim 15, wherein the weightings applied to the measurements of the tool rotational speed or time derivative thereof are based on a signal-to-noise ratio and a bandwidth of the device relative to the magnetometers.

18. The downhole tool according to 1, wherein at times when the device is unavailable or its measurements are unreliable, the processor unit calculates the rotational speed of the tool for use in the calculation of the angular positions of the tool from the measurements of the Earth's magnetic field.

19. The downhole tool according to claim 1, further comprising at least one of a telemetry unit for transmitting the calculated angular positions or a storage unit for storing the calculated angular positions.

20. The downhole tool according to claim 1, wherein the downhole tool comprises two magnetometers and the weighted errors of the measurements of the Earth's magnetic field and the tool rotational speed or time derivative thereof is expressed by the equation:

$$E = K_X(M_X - \cos(\theta_j))^2 + K_Y(M_Y - \sin(\theta_j + \tau))^2 + C(\theta_j - (\theta_{j-1} + \Omega dt))^2$$

wherein:

$K_x$, $K_y$ and C are weighting quantities, $M_x$ and $M_y$ are magnetic components along x and y axes of the magnetometer, respectively, $\Theta_j$ and $\Theta_{j-1}$ are angles between magnetometer axis $m_x$ and a direction of Earth's magnetic field at time steps j and j−1, respectively, τ is a departure from 90° of an angle between magnetometer axes $m_x$ and $m_y$, Ω is true rotation speed, and dt is time between samples.

* * * * *